United States Patent
Singh et al.

(10) Patent No.: US 8,613,791 B2
(45) Date of Patent: Dec. 24, 2013

(54) EXTRACTION PROCESS FOR METALS LIKE GOLD AND PLATINUM INCLUDING FINE GRINDING, PULPING AND OXYGENATING

(75) Inventors: Adrian Singh, Benoni (ZA); Brian Tinniswood, Randburg (ZA); Michael Battersby, Cardiff (ZA); Rainer Imhof, Dorsten (DE)

(73) Assignee: Maelgwyn Mineral Services Africa (Proprietary) Limited, Maraisburg (ZA)

( * ) Notice: Subject to any disclaimer, the term of this patent is extended or adjusted under 35 U.S.C. 154(b) by 1142 days.

(21) Appl. No.: 11/721,793
(22) PCT Filed: Dec. 15, 2005
(86) PCT No.: PCT/IB2005/003786
§ 371 (c)(1), (2), (4) Date: Jul. 30, 2009
(87) PCT Pub. No.: WO2006/064350
PCT Pub. Date: Jun. 22, 2006

(65) Prior Publication Data
US 2009/0293679 A1    Dec. 3, 2009

(30) Foreign Application Priority Data
Dec. 15, 2004    (ZA) .................... 2004/10146

(51) Int. Cl.
C22B 9/00     (2006.01)
C21B 9/00     (2006.01)
C22B 11/00    (2006.01)
C21B 15/00    (2006.01)
C22B 15/00    (2006.01)

(52) U.S. Cl.
USPC .............. 75/710; 75/741; 75/743; 75/744; 266/101

(58) Field of Classification Search
USPC .............. 75/710, 743, 744, 741; 266/101
See application file for complete search history.

(56) References Cited

U.S. PATENT DOCUMENTS

| | | | |
|---|---|---|---|
| 4,738,718 A | 4/1988 | Bakshani et al. | |
| 4,992,097 A * | 2/1991 | Fricker | 75/733 |
| 5,308,380 A * | 5/1994 | Hallinan et al. | 75/744 |
| 6,170,669 B1 * | 1/2001 | Senior et al. | 209/166 |
| 6,251,163 B1 | 6/2001 | King | |
| 6,833,021 B1 * | 12/2004 | Hourn et al. | 75/744 |
| 6,835,230 B2 * | 12/2004 | Kanno et al. | 75/743 |

FOREIGN PATENT DOCUMENTS

| | | |
|---|---|---|
| AU | 27182/92 A | 4/1993 |
| EP | 0 574 175 A1 | 12/1993 |
| RU | 2 117 709 C1 | 8/1998 |
| WO | WO 00/17407 A1 | 3/2000 |

* cited by examiner

*Primary Examiner* — Keith Walker
*Assistant Examiner* — Alexander Polyansky
(74) *Attorney, Agent, or Firm* — Ada O. Wong; Morgan, Lewis & Bockius LLP (57) ABSTRACT

This invention relates to a process for obtaining metal values, typically base metals, platinum or gold from a feed material. In a first step of the process of the invention, feed material containing metal values is ground to a particle size $d_{90}$ of 100 microns or less to form an ultra fine pulp. In a second step of the process of the invention, the ultra fine ground pulp from the first step is oxygenated by pumping it in multiple passes through an in-line high shear static oxygenation device (30), while re-circulating it on a tank (28) or any other vessel. The process of the invention results in a significant reduction in the required leach time, improved recoveries, reduced cyanide consumptions, a steadier gold tail, as well as reduced capital and operational expenditure.

20 Claims, 5 Drawing Sheets

EXTRACTION PROCESS FOR METALS LIKE GOLD AND PLATINUM INCLUDING FINE GRINDING, PULPING AND OXYGENATING

BACKGROUND

This invention relates to a process for obtaining metal values, typically base metals, platinum or gold from a feed material.

U.S. Pat. No. 6,833,021 describes a process for obtaining metal values, typically base metals, platinum or gold from a feed material. In this process, a feed material is milled to a fine size and is leached with a solution comprising lime and/or limestone in the presence of an oxygen containing gas. The reaction is carried out in an open tank and oxygen is introduced via a spear by sparging. The oxygen consumption of the process is high, at 200 to 1000 kg of oxygen per tonne of solids. Heat is added to the tanks and the aim of the process is total sulphide breakdown. The lime consumption of the process is also very high at 100 to 1200 kg of lime and/or limestone per tonne of solids. Furthermore, this process requires a large tank farm for sulphide breakdown and has high capital and operational expenditures.

It is an object of this invention to provide an improved and economical process for obtaining metal values such as base metals, platinum or gold from a feed material.

SUMMARY

According to the invention there is provided a process for obtaining metal values, typically base metals, platinum or gold from a feed material, the process including the steps of:
1) obtaining a feed material in the form of a pulp with a particle size of $d_{90}$ of 100 microns or less, preferably 50 microns or less, more preferably 25 microns or less, more preferably 15 microns or less, most preferably 10 microns or less;
2) passing the pulp through an oxygenating device in multiple passes; and
3) optionally passing the oxygenated pulp through a leach step.

Steps 1) and 2) could be performed simultaneously.

The Oxygenating device of step 2) is preferably operated at a pressure of from above 1 bar up to about 10 bar, typically about 2.5 bar.

Oxygen is preferably introduced into the oxygenating device of step 2) in the form of bubbles, the bubbles preferably having a size of from 1 micron to 1000 microns, preferably 1 to 500 microns, typically an average of 100 microns.

Advantageously, the oxygenating device provides high shearing to the pulp.

Preferably, the oxygen line pressure at the point of injection of oxygen is above the pressure of the oxygenating device, typically at a pressure of about 10 bar.

The Oxygen consumption of the oxygenating device of step 2) may be from 20 kg/t to 200 kg/t pulp.

Preferably, the pulp is re-circulated through the oxygenation device in step 2) in 10 or more passes, for example, from 10 to 300 passes, usually from 20 to 200 passes, preferably 50 to 200 passes, typically about 100 to 150 passes.

The pulp may be re-circulated through the oxygenation device in step 2) via a tank and the pH of the material in the tank should be maintained between 10 and 11, typically by adding lime, or any other alkali.

BRIEF DESCRIPTION OF THE DRAWINGS

FIG. 5 clearly depicts the benefit of the invention over the fine grind only option. The tail grade actually increases sharply when find grinding is utilised on its own followed by cyanide leaching (increases from 8 g/t to 12 g/t). After fine grinding and 100 passes of the oxidation step of the invention, the tail grade drops dramatically down to around 4 g/t.

DESCRIPTION OF EMBODIMENTS

Figure 1:
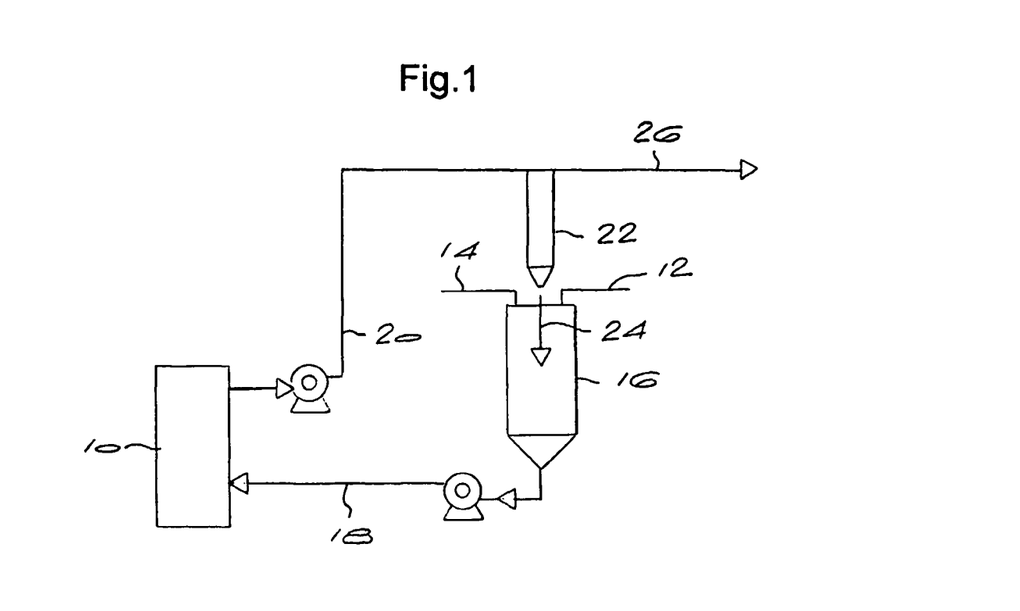
FIG. 1 is a flow diagram of a first step of the invention in which a feed material is ground to form an ultra fine pulp.

In a first step of the process of the invention, feed material containing metal values is ground to provide a particle size $d_{90}$ of 100 microns or less, preferably 50 microns or less, more preferably 25 microns or less, more preferably 15 microns or less, most preferably 10 microns or less to form an ultra fine pulp. In accordance with an embodiment of the invention and with reference to FIG. 1, a feed material in the form of a refractory gold feed source, either flotation or gravity concentrate or "as is" material, is introduced to a mill and ground down to the gold grain liberation size of 0.5 to 20 microns, preferably in a vertical stirred mill, utilising grinding media preferably between 1 and 2 mm diameter, for example using a Deswik™ vertical stirred mill or equivalent. Fresh feed 12 to be milled is pumped or fed by gravity to a mill feed tank 16. The material to be milled is pumped from the mill feed tank 16 via a line 18 to the mill 10. Milled material exiting the mill 10 is pumped via a line 20 through a classifying cyclone 22. Underflow 24 (comprising oversize material) from the cyclone 22 reports back to the mill feed tank 16, while the cyclone overflow (ultra fine pulp having the desired particle size) reports to the next step of the process via a line 26, namely the oxidation step. There should preferably be some screening before the mill 10 to prevent oversize materials from damaging the mill lining and grinding discs. The mill 10 should be fed at a constant recommended flow rate and density should be regulated between 40 to 50% solids by water addition to the mill feed tank 16. Water 14 should also be added to the mill feed tank if the viscosity of the milled pump rises uncomfortably high for pumping. Alternatively, any other form of ultra fine milling machine or technology may be used.

For ores containing appreciable quantities of "preg-robbing" carbonaceous material such as graphite, for example, it may be advantageous to include a carbon removal step before the ultra fine grinding step of the invention. This can be achieved in various ways—for example, one could employ a combination of gravity methods (tables and/or other) with flotation and high pressure cycloning to return entrained pyrite in the carbon concentrate. In this way, a discard fraction of carbon may be produced. If the gold grade in the carbon concentrate is too high to discard, alternative methods could be used to extract the gold from the carbon, for example incineration followed by cyanide leaching.

Figure 2:
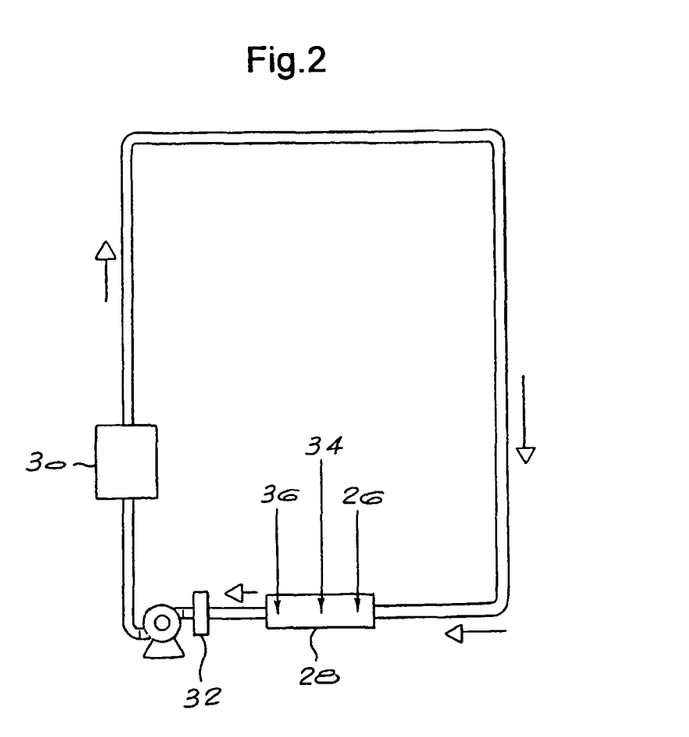
FIG. 2 is a flow diagram of a second oxidation step of the invention.

In a second step of the process of the invention, the ultra fine ground pulp from the first step is oxygenated by pumping it through an in-line high shear static oxygenation device, while re-circulating it on a tank or any other vessel including pipe columns. With reference to FIG. 2, ultra fine ground pulp 26 is fed into a tank 28, which serves as a feed and recirculation tank for an oxygenating device 30. Pulp is drawn from the tank 28 through a screen box 32, to screen out plus 15 mm material, which will cause blockages within the oxygenating device 30. The screened material is then pumped through the oxygenating device 30, generating a slurry back-pressure of from above 1 bar up to 10 bar, typically about 2.5 bar. The back-pressure of the device 30 is read off a pressure gauge. Oxygen is injected into the device 30 via an appropriately sized flow meter. The oxygen line pressure at the point of injection should be above the back-pressure of the oxygenating device, preferably about 10 bar to overcome the slurry back-pressure of the device 30 and to achieve the desired oxygen flow rates. Non-return valves should be installed on the oxygen lines to prevent the ingress of slurry into the oxygen system. The pulp is re-circulated through the oxygenation device 30 via the tank 28 in a plurality of passes. The number of passes through the oxygenation device 30 is critical to the oxidation step. While 100 to 150 passes is typical, this could range from more than 10 passes to 300 passes, depending on the ore being treated. The bubble size generated in the oxygenation device 30 is also important, and could range from 1 micron to 1000 microns, preferably 1 to 500 microns, typically an average size of 100 microns. The slurry should be pumped at a rate of 5 to 20 m/s, typically about 10 m/s, through the oxygenating device to create the internal shear within the unit. The back-pressure of the device 30 could range from above 1 bar up to about 10 bar. Advantageously, the device 30 utilises a non-blinding porous media (such as a PTFE fritte) arrangement or a slot or plate nozzle venturi system to inject tiny oxygen bubbles into the pulp. The subsequent pressure chamber system causes the rapid expansion and contraction of these bubbles (cavitation), which assists with the dissolution of the oxygen. The design of the device 30 discourages bubble coalescence, and the pressure hold-up (around 2.5 bar but can range from above 1 bar up to about 10 bar) also encourages oxygen dissolution. Oxygen consumption could range from 20 kg/t to 200 kg/t, depending on the ore.

The oxidative stage is carried out in the oxidation device/reactor which operates at a pressure of above 1 bar up to about 10 bar. Oxygen is introduced to the reactor slurry to assist the oxidation. The oxidation is auto-thermal, not requiring any external heat. The temperature can be controlled by the addition of oxygen.

The general reactions in the oxidation reaction are:

$FeS+1/2O_2+H_2SO_4=FeSO_4+SO+H_2O$ $FeS2+15/4O2+1/2H2O=1/2Fe2(SO4)3+1/2H2SO4 FeS2+9/4O2+1/2H2SO4=1/2Fe2(SO4)3+1/2H2O+S$

Other reactions including the oxidation of arseno-pyrite also occur, for example the arsenic Oxidation and Fixation as Ferric Arsenate:

$HAsO_2+Fe_2(SO_4)_3(a)+2H_2O=H_3AsO_4+2FeSO_4(a)+H_2SO_4 Fe_2(SO_4)_3+2H_3AsO_4+3CaO=2FeAsO_4+3CaSO_4 \cdot 2H_2O+H_2O$ Other base metal sulphides are also oxidised, for example chalcopyrite.

These oxidation reactions assist in the break-down of the sulphide matrix, hence exposing the occluded gold particles.

The pH within the feed tank 28 should be maintained between 10 and 11 by adding lime, or any other alkali, 34. A by-product of the oxidation reactions is sulphuric acid, which lowers the pH. If the pH drops to between 7 and 9, the risk of thiosulphate leaching of gold increases. This is undesirable as the gold thiosulphate complex is extremely unstable and tends to plate out on charged surfaces resulting in gold losses. Lime consumptions in this oxidative step is higher than the norm for gold leaching and could range from 10 kg/t to 200 kg/t depending on the ore being treated. However, this is still an order of magnitude lower than the process of U.S. Pat. No. 6,833,021. Another by-product of the oxidation reactions is heat, as the reactions are exothermic. Pulp temperatures can range from 30 to 95° C. depending on the ore being treated. Pulp temperatures should be monitored as they are an indication that effective oxidation is taking place. The viscosity of the pulp should also be visually monitored and water 36 should be added if the viscosity rises too high.

The objective of the oxidation step is not necessarily to oxidise the sulphide matrix, so breaking it down, but rather to satisfy the cyanide consumers that easily go into solution. However, partial to full breakdown of the sulphide matrix can be achieved in this step, if it proves to be economical when one weighs incremental gold recovery against reagent consumption.

For more aggressive oxidation, various acids could be used. Alternative oxidants ranging from peroxide to ozone to air could also be used.

Figure 3:
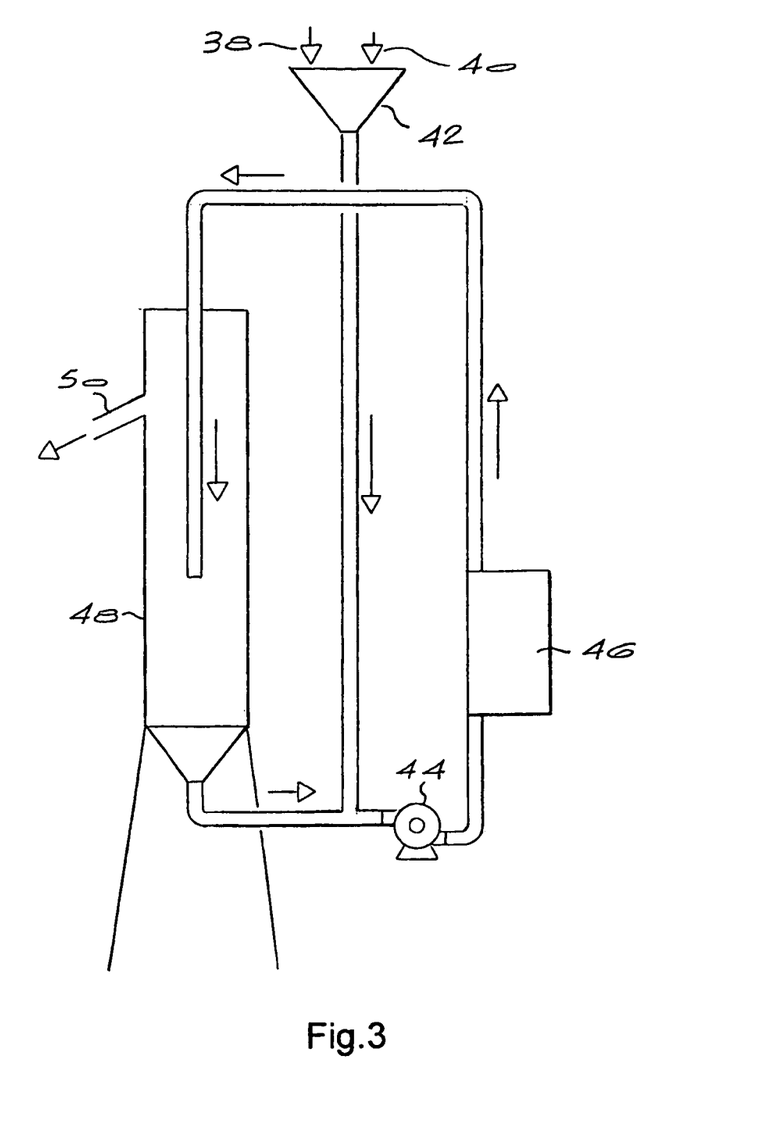
FIG. 3 is a flow diagram of an optional third leaching step.
Figure 4:
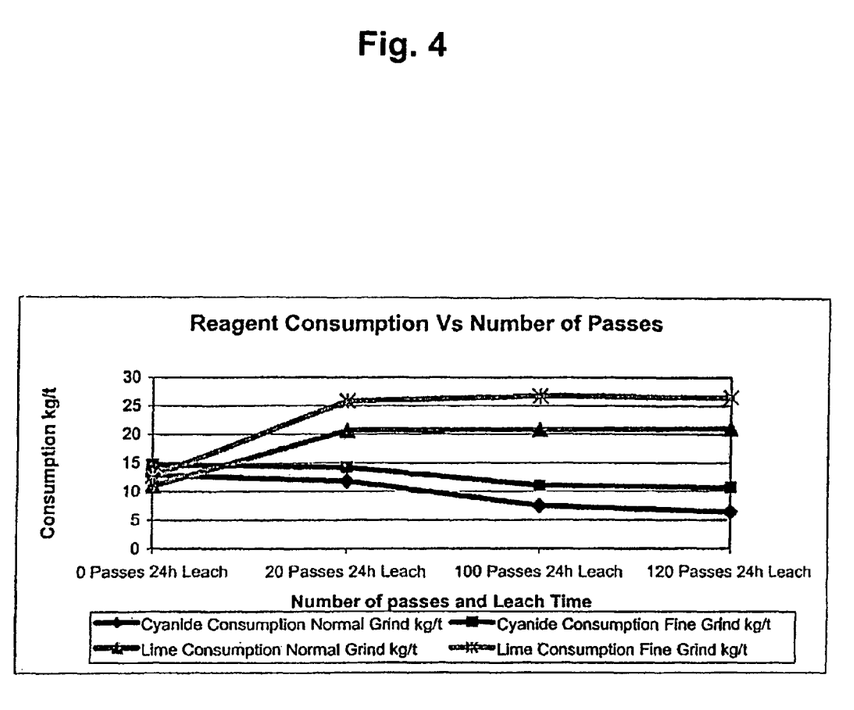
FIG. 4 shows a slight increase in lime consumption when a sample of normal grind (80% passing 75 microns), is ground fine (to a $d_{90}$ of 15 microns), and then subjected to a cyanide leach. The lime consumption increases to a little over double the consumption required for fine grind only, when subjected to the oxidation step of the invention. However, the consumption of 25 kg/t is still minimal when compared to the process of U.S. Pat. No. 6,833,021.
Figure 5:
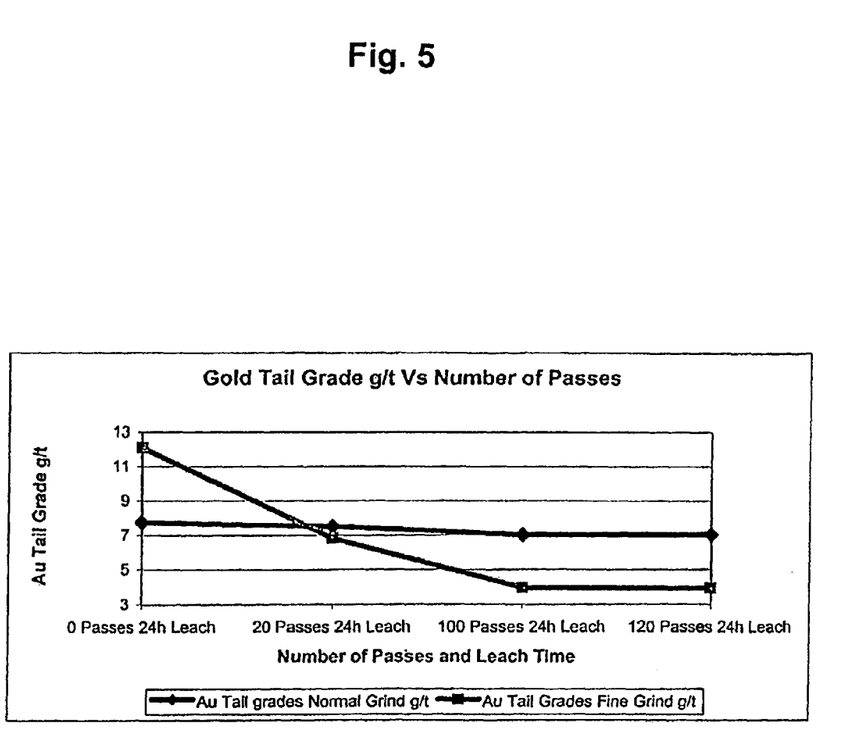
Figure 6:
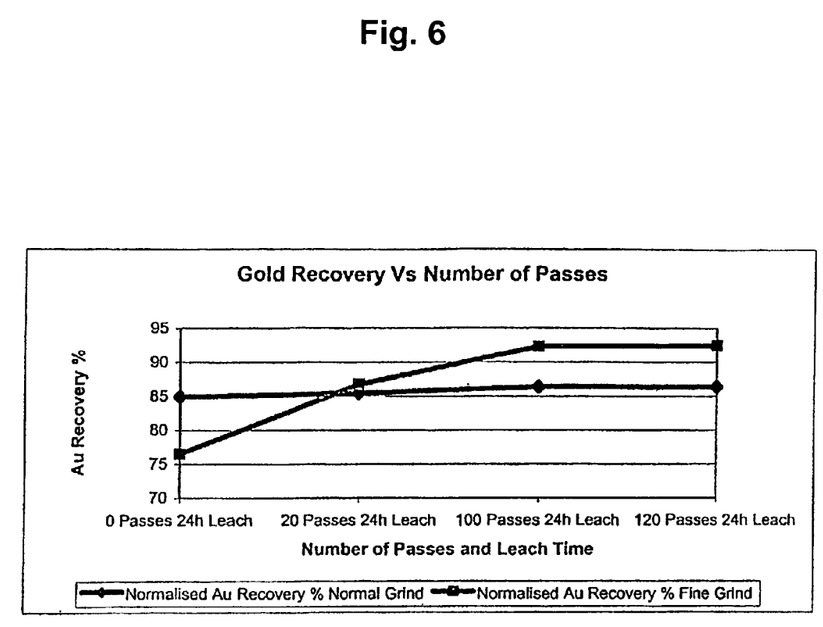
FIG. 6 illustrates the fall off in recovery (from 85% to around 76%) for the sample subjected to fine grind only without the oxidative steps of the invention, and the dramatic increase in recovery to 92% when fine grinding is coupled with the oxidative steps of the invention.

The third step of the process is a static mixer/oxygenater leach step. This step is not critical to the process but does assist with speeding up of the leach kinetics. This step is not advisable if there are very aggressive so-called preg-robbers present in the ore—standard laboratory preg-robbing tests should first be performed to assess the extent of preg-robbing. Here a similar mixer/oxygenater as those described for the oxygenation step is used to improve contact between the pulp and a lixiviant such as cyanide, whilst also oxygenating the pulp. With reference to FIG. 3, fresh feed 38 from step 2) together with cyanide 40 is introduced to the system via a funnelled pipe 42 close to a suction pump 44, through a mixer/oxygenter 46 and to a pipe column 48, which functions as a recirculation vessel. A combination of fresh and recirculated pulp is pumped through the oxygenater 46 at approximately 2.5 bar back-pressure (can range from above 1 to 10 bar). Oxygen is added into the oxygenater 46 via a flow meter. The oxygen line pressure is preferred to be around 10 bar. The back-pressure on the oxygenater 46 is measured via a pressure gauge. It is preferred that the pulp is screened via a screen-box before the pump suction to discard plus 15 mm particles which will cause blockages within the oxygenator 46. The pulp exiting the oxygenater 46 is discharged into the pipe column 48 at a point below the overflow 50 on the column 48. The overflow 50 from the column 48 can either be gravitated or pumped to the leach plant of choice, preferably Carbon in Leach (CIL) or Resin in Leach (RIL). The solids are kept in suspension in the column 48 by the high rate of pumping. 20 passes is preferred but passes can vary from 1 to 100 passes.

It is well known in the industry that both oxygen and cyanide are required for leaching. It is also known that the kinetics and the extent of the leach is dependent on the degree of agitation of the pulp and pressure and temperature. The requirements for leaching are met within the oxygenater, and hence the kinetics and the extent of leaching are improved. Faster kinetics dramatically reduces the size of the subsequent leach plant required while also providing the added benefit of higher carbon and resin loadings for CIL and RIL plants, reducing the gold lock-up in the adsorbent. Lower gold soluble losses are also possible owing to the much longer contact time between the dissolved gold and the adsorbent. A much steadier and more forgiving leach plant operation results.

Some gold ores contain appreciable quantities of copper or other base metals that make the gold leach problematic by consuming large quantities of cyanide. In this instance one could include an optional step after the fine grind and oxidation steps of the invention, just prior to the gold leach, for the extraction of copper which can either be discarded if the quantities are too low, or further beneficiated by conventional flow sheets for base metals, if this proves economical. For example, one could have a single carbon in pulp stage to adsorb leached copper before the gold leach. Performing the oxidative step of the invention in an acidic medium might enhance the leaching of the copper. Naturally, the pH would have to be raised again to between 10 and 11 for the cyanide leach.

Although the above process has been described for application in the gold industry on refractory gold ore where gold is encapsulated in mainly pyrite and/or pyrrhotite and/or arsenopyrite, but also quartz, the process may also find application in the base metals and platinum industries.

As a result of the combined effects of the ultra fine grind liberation step, the oxidation step where the pulp is exposed to fine bubbles under shear in multiple passes, and optionally the gold leach within the static mixer/oxygenater, the following benefits can be realised:

A significant reduction in the required leach time, 8% to 25% of the original (e.g. leach times drop by 75% to 90%). For example, the cyanide leach of U.S. Pat. No. 6,833,021 takes approximately 24 hours, whereas the cyanide leach of the present invention takes 2 to 3 hours Gold recoveries of conventional processes can be improved from around 20% to 85%

Cyanide consumptions can be drastically reduced by between 50% and 90% in comparison to conventional processes. Furthermore, the process of U.S. Pat. No. 6,833,021 only provides a reduction of approximately 20% of cyanide.

A much steadier gold tail and a much more forgiving leach plant results

The process may be retrofitted to existing plants

Less capital expenditure than the process of U.S. Pat. No. 6,833,021 (which requires a tank farm) as the process of the present invention can be carried out with a single tank Less operational expenditure as it requires far less oxygen (20 to 200 kg per tonne oxygen consumption in the present invention) and also far less lime (50 to 200 kg per tonne lime consumption for the present invention) in comparison to the process of U.S. Pat. No. 6,833,021 (which has an oxygen consumption of 200 to 1000 kg of oxygen per tonne of solids and a lime consumption of 100 to 1200 kg of lime and/or limestone per tonne of solids).

In a fourth step, the product from the static mixer/oxygenater leach step is then further processed by existing conventional methods. CIL or RIL is preferred but lixiviants other than cyanide and other methods including zinc precipitation etc. may also be used.

The invention will now be described in more detail with reference to the following non-limiting Examples:

Example 1

Feed material from a carbonaceous sulphide ore was ultra fine ground to a particle size $d_{90}$ of 5.7 microns at a 1:1 liquid to solid ratio. The pH of the material was then adjusted to 11 by adding lime. This slurried material was then given 100 passes (equivalent) through an in-line shear oxygenating device (in this case an Aachen™ Aerator available from Maelgwyn Mineral Services Ltd). The slurried material was pumped through the oxygenating device, generating a slurry back-pressure of 2.5 bar. Oxygen was injected into the oxygenating device at an oxygen line pressure of 5-6 bar through a non-blinding PTFE 10 micron fritte to provide an average oxygen bubble size of 100 microns. The oxidised material was then subjected to standard bottle roll test work in the presence of cyanide and carbon and the recovery is provided in Table 1 below.

Table 1 below also provides the result of a Base Case where the process was carried out on ore having a particle size $d_{90}$ of 348 (i.e. without fine grinding) and without the oxygenation and shearing step.

TABLE 1

| An example of a carbonaceous sulphide ore | | | | | | |
|---|---|---|---|---|---|---|
| | Head | Tail | % Rec | NaCN add'n kg/t | Residual NaCN % | NaCN Consump. kg/t | Carbon (g/l) |
| Base Case | 16.1 | 12.0 | 25.5 | 15 | 0.805 | 6.95 | 5 |
| Example 1 | 16.1 | 2.69 | 83.3 | 16 | 1.52 | 0.80 | 5 |

From Table 1 it is evident that, for oxidized slurry treated according to Example 1, which was ultra fine ground to $d_{90}$ of 5.7 microns, in comparison to the Base Case, in a cyanide leaching step, recoveries are improved from 25 to 83%. Cyanide consumption for a slurry from Example 1 also decreases, in comparison to the Base Case, from 6 kg/t to 0.8 kg/t.

Example 2

Refractory gold ore feed material which is a sulphide flotation concentrate was fine ground to a particle size $d_{90}$ of 10 microns at a 1:1 liquid to solid ratio. The pH of the material was then adjusted to 11 by adding lime. This slurried material was then given different numbers of passes through an in-line shear oxygenating device (in this case an Aachen™ Aerator available from Maelgwyn Mineral Services Ltd). The slurried material was pumped through the oxygenating device, generating a slurry back-pressure of 2.5 bar. Oxygen is injected into the oxygenating device at an oxygen line pressure of 5-6 bar through a non-blinding PTFE 10 micron fritte to provide an average oxygen bubble size of 100 microns.

Table 2 below shows the recoveries after a 24 hr cyanide leach for a case where no oxidation step takes place, and processes of the invention where 20 and 100 passes are made through the oxygenating device and then a 24 hr cyanide leach takes place, and where 100 passes are made through the oxygenating device followed by 20 passes through an oxygenating device which includes a cyanide leach (15 kg/t cyanide) and then a 24 hr bottle roll cyanide leach.

After the cyanide leaches which were done by bottle rolls, the samples were filtered and washed and then the solids residue, solution and carbon were analyzed for gold. Carbon and solid masses after drying were recorded. Final pHs and terminal cyanide concentrations were determined. Recoveries were calculated and recorded and are provided in Table 2.

TABLE 2

|  | Plant Head Au g/t | Residues Au g/t | Recoveries % |
|---|---|---|---|
| 24 Hour Leach | 51.50 | 12.20 | 76.31 |
| 20 Passes ox, 24 Hour Leach | 51.50 | 8.60 | 83.30 |
| 100 Passes ox, 24 Hour Leach | 51.50 | 8.00 | 84.47 |
| 100 Passes ox + 20 Passes Cyanide Leach, 24 Hour Leach | 51.50 | 7.00 | 86.41 |

Table 2 shows that the passes through the oxidation device increases the gold recoveries from 76.31% to 83.30% for 20 passes and to 84.47% for 100 passes, and a recovery to 86.41% is achieved by having the additional step of passing through the oxygenating device that includes a cyanide leach. Tail grades dropped from 12.20 g/t for the base case, to 8.00 g/t for 100 passes through the oxygenating device to 7.00 g/t with additional step of passing through the oxygenating device that includes a cyanide leach.

Example 3

Graphs 1-3 below show the advantages of the Invention over an existing process utilizing normal grind (80% passing 75 microns), as well as, over an existing process utilising fine grinding alone (where the multiple pass oxidation step of the invention is not used, represented by the zero passes points on the graphs) and the improvements that the invention has on Au recovery in both instances.

Example 4

TABLE 3

| Sample | Grind | Head Au g/t | Tail Au g/t | Recovery % | Cyanide Consumption kg/t | Lime Consumption kg/t |
|---|---|---|---|---|---|---|
| Fine Grind | $d_{80}$ 25 microns | 20.54 | 8.14 | 60.37 | 22 | 11.15 |
| Fine Grind | $d_{100}$ 25 microns | 19.1 | 10.96 | 42.62 | 27 | 13.74 |
| Fine Grind + 130 passes oxidation | $d_{100}$ 25 microns | 20 | 6.33 | 68 | 2 | 34.38 |

Table 3 illustrates a decrease in recovery from 60.37% for $d_{80}$ of 25 microns to 42.62% for $d_{100}$ of 25 microns when fine grinding is employed on its own. The combination of fine grinding to $d_{100}$ 25 microns (100% passing 25 microns) and 130 passes of the oxidation step of the invention improves the recovery to 68%. Fine grinding on its own does not improve recoveries, but in fact lowers the recovery in this instance. Also of significance is the large decrease in cyanide consumption, from 22 kg/t for fine grinding on its own, down to 2 kg/t for the fine grind plus multiple pass oxidative steps of the invention. Lime consumption increases from 11.15 kg/t for fine grinding on its own to 34.38 kg/t for the fine grind plus multiple pass oxidative steps of the invention, but is still reasonable compared to the lime consumption if the process of U.S. Pat. No. 6,833,021 (which is 100 to 1200 kg of lime and/or limestone per tonne of solids).

1 bar=$1\times10^5$ Pa
1 ton=1000 kg

The invention claimed is:

1. A process for obtaining metal values from a feed material, the process including the steps in sequence:
   1) obtaining a feed material in the form of a pulp with a particle size of $d_{90}$ of 100 microns or less;
   2) passing the pulp through an oxygenating device in ten or more passes, wherein oxygen is introduced into the oxygenating device in the form of bubbles; and
   3) passing the oxygenated pulp through a leach step.

2. The process of claim 1, wherein the metal values are base metals, platinum or gold.

3. The process of claim 1, wherein the feed material is a pulp with a particle size of $d_{90}$ of 50 microns or less.

4. The process of claim 3, wherein the feed material is a pulp with a particle size of $d_{90}$ of 25 microns or less.

5. The process of claim 4, wherein the feed material is a pulp with a particle size of $d_{90}$ of 15 microns or less.

6. The process claim 1, wherein the oxygenating device of step 2) is operated at a pressure of from above 1 bar ($1\times10^5$ Pa).

7. The process of claim 6, wherein the oxygenating device of step 2) is operated at a pressure of up to about 10 bar ($1\times10^6$ Pa).

8. The process of claim 7, wherein the oxygenating device of step 2) is operated at a pressure of about 2.5 bar ($2.5\times10^5$ Pa).

9. The process of claim 1, wherein the bubbles have a size of from 1 micron to 1000 microns.

10. The process of claim 9, wherein the bubbles have a size of from 1 micron to 500 microns.

11. The process of claim 1, wherein the bubbles have an average size of 100 microns.

12. The process of claim 1, wherein the oxygenating device provides high shearing to the pulp.

13. The process of claim 1, wherein the oxygen line pressure at the point of injection of oxygen in the oxygenating device is above the pressure of the oxygenating device.

14. The process of claim 13, wherein the oxygen line pressure is about 10 bar ($1\times10^6$ Pa).

15. The process of claim 1, wherein the oxygen consumption of the oxygenating device of step 2) is from 20 kg/t to 200 kg/t pulp.

16. The process of claim 1, wherein the pulp is re-circulated through the oxygenation device in step 2) in from 10 to 300 passes.

17. The process of claim 16, wherein the pulp is re-circulated through the oxygenation device in step 2) in from 20 to 200 passes.

18. The process of claim 17, wherein the pulp is re-circulated through the oxygenation device in step 2) in from 50 to 200 passes.

19. The process of claim 18, wherein the pulp is re-circulated through the oxygenation device in step 2) in from 100 to 150 passes.

20. The process of claim 1, wherein the pulp is re-circulated through the oxygenation device in step 2) via a tank and the pH of the material in the tank should be maintained between 10 and 11.

* * * * *